United States Patent [19]

Platsch

[11] 4,024,815

[45] May 24, 1977

[54] DEVICE FOR SPRAYING POWDER

[75] Inventor: Hans Georg Platsch, Stuttgart, Germany

[73] Assignee: Firm Albin Platsch, Stuttgart-Vaihingen, Germany

[22] Filed: Dec. 16, 1975

[21] Appl. No.: 641,348

[30] Foreign Application Priority Data

May 3, 1975 Germany ........................... 2519831

[52] U.S. Cl. .......................... 101/416 R; 118/312; 118/DIG. 1; 239/120

[51] Int. Cl.² ....................................... B41F 23/06

[58] Field of Search ................. 101/416, 417, 418; 239/120, 121, 122; 118/312, 308, DIG. 1, 50

[56] References Cited

UNITED STATES PATENTS

| | | | |
|---|---|---|---|
| 2,288,129 | 6/1942 | Feldhausen et al. | 101/417 X |
| 2,897,743 | 8/1959 | Marantz | 239/120 X |
| 3,053,180 | 9/1962 | Doyle | 118/DIG. 1 |
| 3,478,969 | 11/1969 | Lund | 118/308 X |
| 3,516,607 | 6/1970 | Shelor | 239/120 X |
| 3,678,894 | 7/1972 | Walsh | 118/308 X |

FOREIGN PATENTS OR APPLICATIONS 1,154,543  6/1969  United Kingdom ............... 118/312

Primary Examiner—Evon C. Blunk
Assistant Examiner—Michael Mar
Attorney, Agent, or Firm—Edwin E. Greigg

[57] ABSTRACT

A system for feeding powder in spray form to a device associated with a machine which transports products to be sprayed. The device associated with the machine is arranged to spray powder on the work surface in a controlled zone with the system being operated to receive surplus powder from the work zone and return it to storage for re-use.

5 Claims, 6 Drawing Figures

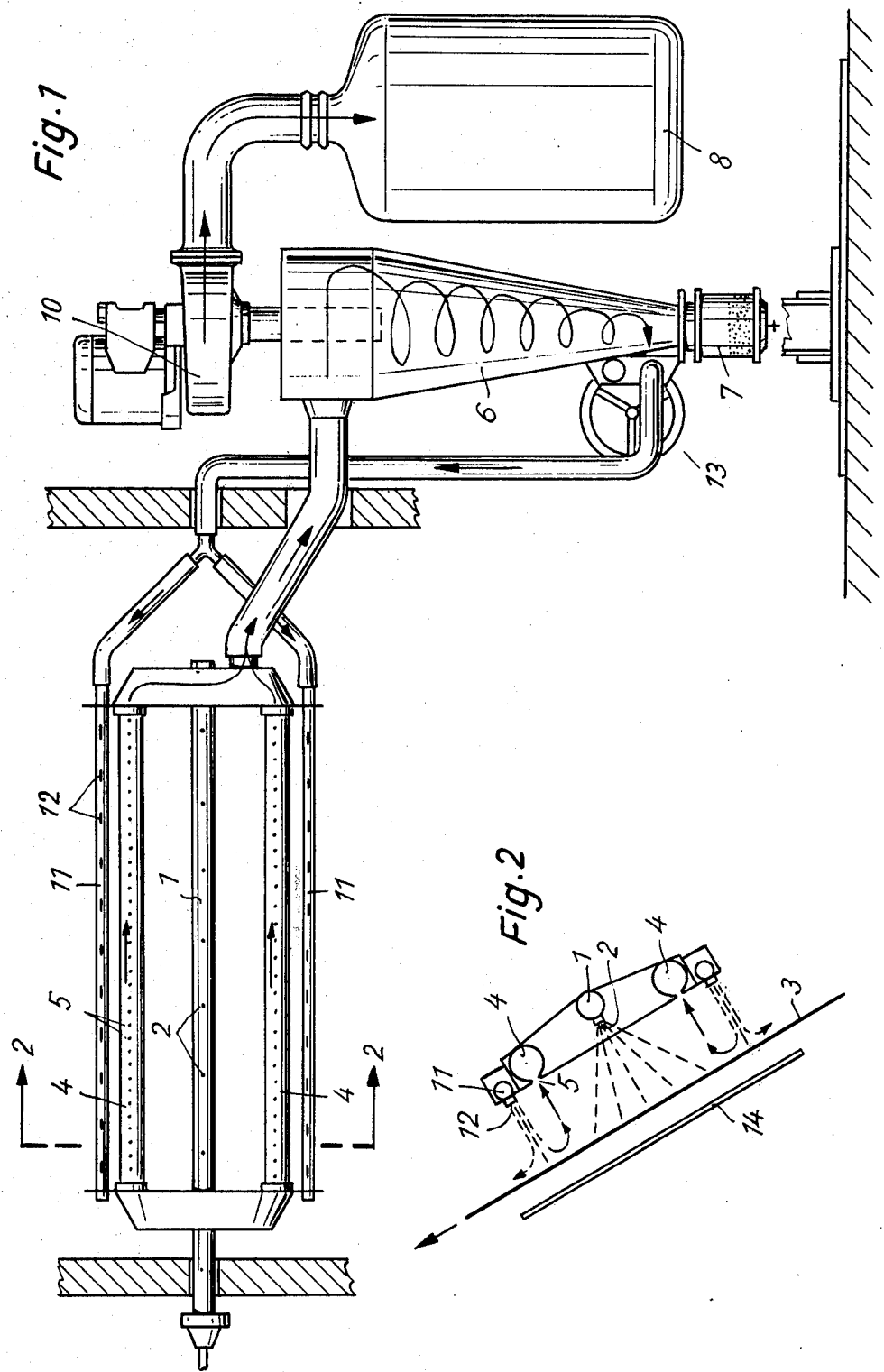

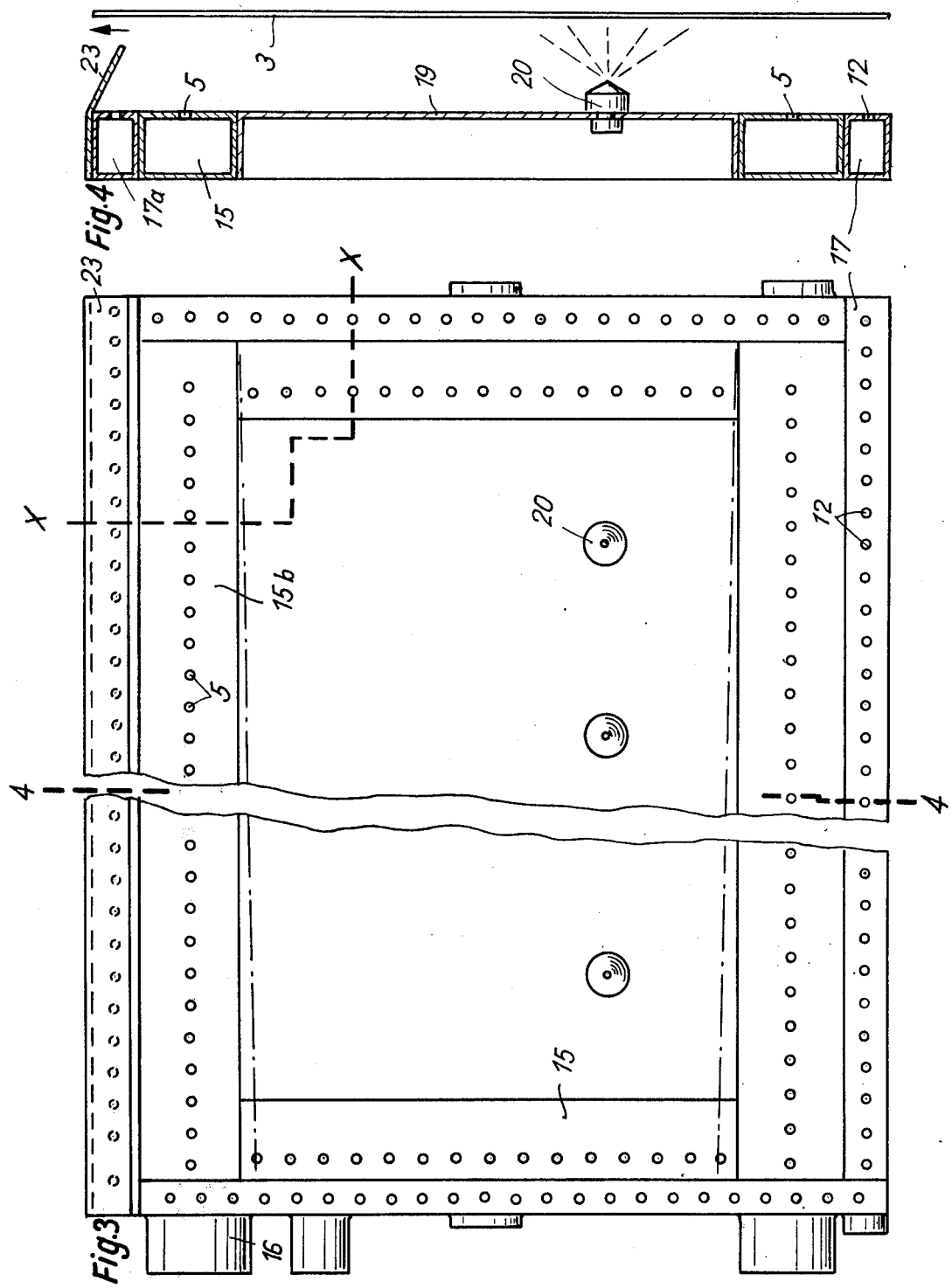

DEVICE FOR SPRAYING POWDER

BACKGROUND OF THE INVENTION

The present invention relates to a device for spraying powder; more paticularly, for spraying powder onto freshly printed sheets, comprising one or more powder supply conduits form which powder is sprayed by means of compressed air for the purpose of preventing the individual sheets from being smudged. The excess powder is drawn off as far as possible by a vacuum system provided through a suction conduit and, further a curtain of blast air is arranged to confine the sprayed powder to a powder spraying zone which is at least the width of the paper sheet, all of which is claimed in German Patent Application No. P 2,207,983.0.

Devices of this general type have the disadvantage that very fine-grained powder is not only sprayed onto the freshly printed sheets but also onto the surrounding machine parts as well and more particularly, onto the conveyor elements used to transport the sheets. The printing plates are subjected to increased wear owing to the undesirable effect of the sprayed powder. This almost inevitably represents an additional problem for the operator. One of the consequences is increased expenditure for maintaining a printing press equipped with a device of this type. Furthermore, it is not possible to recover the powder sprayed outside of the operating zone.

These disadvantages are obviated according to the invention by providing a curtain of blast air, which prevents the powder from escaping, about the powder spraying zone which is at least the width of a printed sheet.

OBJECTS AND SUMMARY OF THE INVENTION

Accordingly, the principal object of the invention is to provide various measures for confining the sprayed powder within restricted zone.

Another object of the invention is to encompass the sprayed powder by a curtain of blast air so that particulate material can be confined to a predetermined area.

Still another object of the invention is to provide a vacuum system to withdraw surplus unused spray powder from the zone where the spraying is conducted and return it to a supply source.

Yet another object of the invention is to provide plural means for storing particulate powder material of varying grades.

Yet still another object of the invention is to provide concentric hollow frame strutures the innermost of which is perforated and arranged to draw a vacuum on the surplus spray powder and the outermost of which is adapted to provide a curtain of blast air that assists in confining the area to which the spray powder is emitted.

In view of the foregoing, it will be seen that the invention relates to improvements in a device for spraying powder, and more particularly for spraying powder on freshly printed sheets, which comprises at least one powder supply conduit form which powder is sprayed by means of compressed air for the purpose of preventing the individual sheets from being smudged. Further, the construction comprises a substantially rectangular frame structure provided with a plurality of branched, apertured ducts which are arranged to straddle a series of nozzles which emit said spray powder to said sheets. The apertured ducts futher include at least one further pair of inboard apertured ducts adapted to communicate with a source of vacuum and at least one pair of additional branched, apertured ducts outboard of said first named ducts, said outboard apertured ducts being adapted to emit a curtain of blast air which serves to return excess spray powder to a separator assembly.

Other objects and advantages of the present invention will be more readily apparent from a further consideration of the following detailed description of the drawings illustrating a preferred embodiment of the invention, in which:

BRIEF DESCRIPTION OF THE DRAWINGS

FIG. 1 shows generally in horizontal elevation a powder spraying and recovery system associatad with a device for spraying the powder to a sheet of paper;

FIG. 2 is a cross-section on line 2—2 of FIG. 1;

FIG. 3 is a front elevational view of a further embodiment of the invention showing a perforated frame assembly comprising concentric hollow tubular members and a supporting surface for powder spray nozzles;

FIG. 4 is a corss-section on line 4—4 of FIG. 3 showing the nozzles spraying powder on an advancing sheet of paper;

DESCRIPTION OF THE PREFERRED EMBODIMENTS

Figure 5:
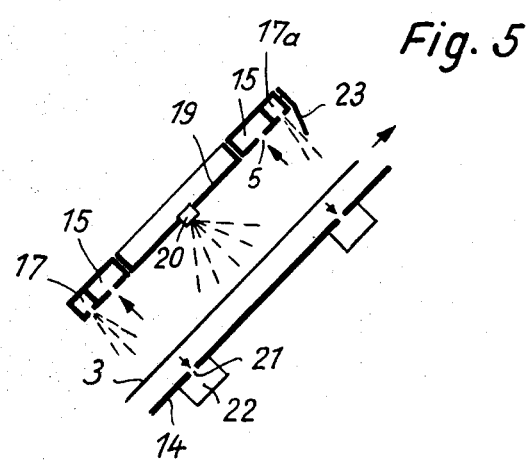
FIG. 5 is a schematic view of the second embodiment of the invention showing further means for recovering surplus spray powder.
Figure 6:
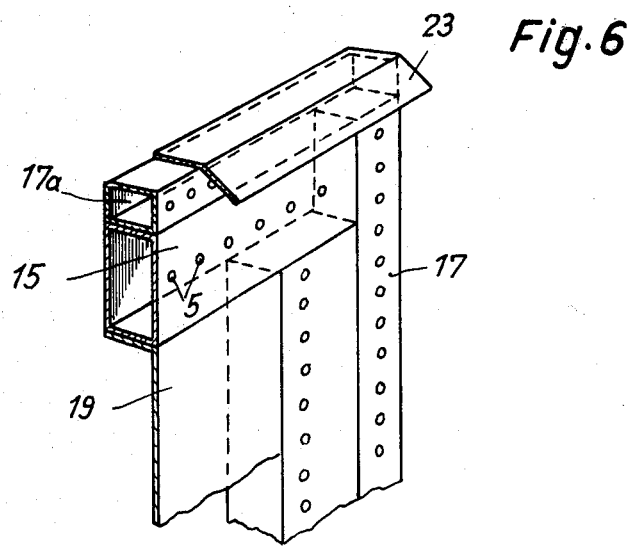
FIG. 6 is an enlarged detail view on line X—X of one corner of the device shown in FIG. 3.

Turning now to FIG. 1, there is shown powder spraying and recovery system which is associated with a powder supply conduit which is mounted in such a way that its nozzle openings 2 are directed generally at right angles to the sheets 3 (FIG. 2) as they move past it. The powder supply conduit 1 is mounted at right angles to the plane of movement of the sheets 3 at a specific distance therefrom; this spacing being required to ensure even spraying of the maximum size of sheets which can be processed by a printing press. In specific cases, a plurality of supply conduits can be provided with given spacing therebetween. Two suction lines 4 (FIG. 2) comprising openings 5 are disposed parallel to the supply conduit 1 at approximately the same distance form the sheets 3 as the conduit 1. The suction lines 4 are designed to extract the surplus powder-air mixture from the sheet zone. The mixture is conveyed to a cyclone 6 where the particles of powder are collected in a known manner in a container 7, in which they can be stored for further use. A dust collecting bag 8 is disposed in series with the cyclone 6. The dust collecting receptacle is used as a fine filter for removing any remaining powder from the air drawn into the system. A fan or blower 10 produces the suction air required for this process.

Parallel to the suction lines 4 and disposed at a short distance therefrom are blast conduits 11 comprising discharge slots 12 from which the blast air produced by a blower 13 is directed toward a baffle plate 14 (FIG. 2). As well shown in FIG. 2, the sheet web travels a path between the parallel arrangement of blast conduits 11 and the plate 14. As a result, a curtain of blast air is produced at both ends of the powder spraying zone in the path of movment of the printed sheets. This curtain of blast air prevents the powder from penetrating beyond the limits of the working zone. A substantial part of the blast air is deflected backwardly by the baffle plate 14, thereby facilitating suction of the powder-air mixture through the suction lines 4.

The blast air is generally discharged from its discharge slots 12 during the entire time the printing press is in operation, whereas, for economic reasons, the powder spraying operation is controlled by known means in such a way that it is only carried out when a sheet of paper is moved through the powder spraying zone.

This system provides two important advantages: firstly, it prevents the powder from escaping arbitrarily and thus eliminates disadvantages such as a high degree of wear of the press and the printing plates and, secondly, it considerably reduces the amount of powder required, as a large portion of the powder is recovered.

A further embodiment of this invention is revealed in FIG. 3 where it is disclosed that both the suction and blast conduits have a rectangular cross-section and are assembled to form a frame and the blast conduits are disposed directly adjacent to the outwardly directed side of the suction conduits over their entire length which corresponds approximately to the circumference of the printed sheet.

Suction conduits 15 have a rectangular cross-section and are joined to form a frame, said frame including suction openings 5 (FIG. 4) on the side directed towards the printed sheets 3 which are moved past them. A connection socket or nipple 16 for the suction lines is mounted on one of the suction conduits. As represented by the dot-dash lines in FIG. 3, the elements comprising the suction conduits which are directed at right angles to the direction of movement of the printed sheets converge toward the point of the connection socket 16 so that powder-containing air which increases in this direction during suction can retain a largely constant flow rate.

Disposed concentrically about the hollow frame supporting the suction conduits 15 is a further hollow frame comprising blast conduits 17 having discharge openings 12 which are directed towards the edges of a sheet to be sprayed with powder. The blast conduits 17 also have a rectangular cross-section.

The space enclosed by the suction conduit 15 is covered by a plate 19. This plate 19 provides a support for a series of nozzles 20 for discharging the powder onto the sheets 3 one of which is shown traveling in front thereof by the arrow.

The sides of the suction and blast conduits 15 and 17 which are directed towards the printed sheets form with the plate 19 a closed surface which effectively prevents the powder from escaping therebeyond.

Suction and pressure conduits with a rectangular cross-section have the advantage over round conduits in that they are capable of receiving a higher throughput while requiring virtually the same space or, if they form a flat structure, even less space.

To further prevent undesirable seepage of powder from the powder spraying zone, the baffle plate 14 as shown in FIG. 5 comprises bore holes 21 and the side of the baffle plate 14 which is remote from the nozzles 20 also comprises suction channels 22 which communicate with the bore holes 21 and through which the surplus powder can be drawn by suction.

The upper wall portion of blast conduit 17a which is disposed at right angles to the direction of movement of the printed sheets is provided with a deflecting plate 23 which is inclined with respect to said wall portion and directed towards the sheet. This deflecting plate is designed to repel the powder which has a tendency to move along with the sheets and thus to reinforce the effect of the curtain of blast air and convey the powder to the suction zone.

These individual measures collectively produce a significant improvement in the removal of powder which has been whirled about in the powder spraying zone. This not only reduces the amount of powder required but also largely protects the areas surrounding the spraying zone from powder deposits.

This device is not only applicable for drawing off powder in the case of printing machines but it can also be used in other systems, for example, in the production of rubber goods.

What is claimed is:

1. A device for spraying powder, more particularly for spraying powder on freshly printed sheets, comprising at least one powder supply conduit from which powder is sprayed by means of compressed air for the purpose of preventing the individual sheets from being smudged and the powder being drawn off by vacuum in a suction line, characterized in that means comprising a substantially rectangular frame structure provided with a plurality of branched, apertured ducts are arranged to straddle a series of nozzles which emit said spray powder to said sheets, said apertured ducts further including at least one further pair of inboard apertured ducts adapted to communicate with a source of vacuum and at least one pair of additional branched, apertured ducts outboard of said first named ducts, said outboard apertured ducts being adapted to emit a curtain of blast air which serves to return excess spray powder to a separator assembly.

2. A device for spraying powder as claimed in claim 1, in which a further means is associated with said separator assembly for recovering fines.

3. A device for spraying powder as claimed in claim 1, in which conveying means are arranged to transport the sheet of paper perpendicularly relative to means defining openings in said powder supply conduit.

4. A device for spraying powder as claimed in claim 3, in which a baffle plate is provided adjacent to said conveying means.

5. A device for spraying powder as claimed in claim 4, in which the baffle plate includes means defining openings therein which are associated with suction means.

* * * * *

UNITED STATES PATENT AND TRADEMARK OFFICE
CERTIFICATE OF CORRECTION

PATENT NO. : 4,024,815

DATED : May 24, 1977

INVENTOR(S) : Hans Georg Platsch

It is certified that error appears in the above—identified patent and that said Letters Patent are hereby corrected as shown below:

Column 1, Line 8, "form" should be –from–
Column 1, Line 51, "strutures" should be –structures–
Column 1, Line 60, "form" should be –from–
Column 2, Line 14, "associatad" should be –associated–
Column 2, Line 21, "corss" should be –cross–

Signed and Sealed this sixteenth Day of August 1977

[SEAL]

Attest:

RUTH C. MASON
Attesting Officer

C. MARSHALL DANN
Commissioner of Patents and Trademarks